Oct. 16, 1934. J. MOREL 1,977,397
RADIO TRANSMITTER
Filed Aug. 27, 1930 2 Sheets-Sheet 1

INVENTOR
JACQUES MOREL
BY H. S. Grover
ATTORNEY

Oct. 16, 1934.   J. MOREL   1,977,397
RADIO TRANSMITTER
Filed Aug. 27, 1930   2 Sheets-Sheet 2
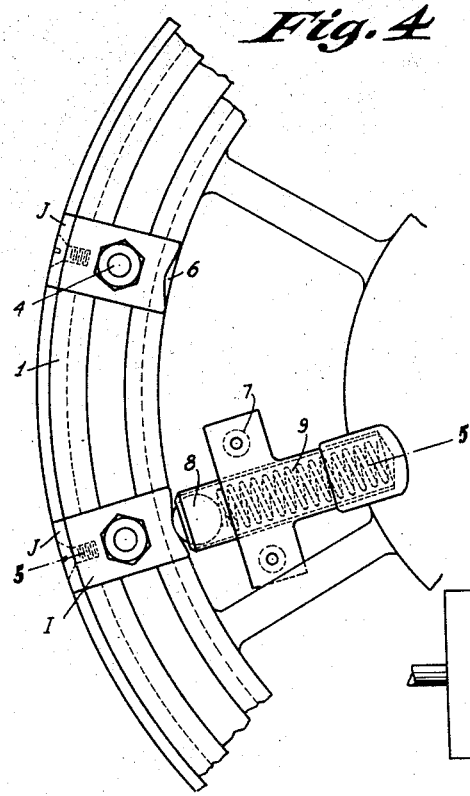
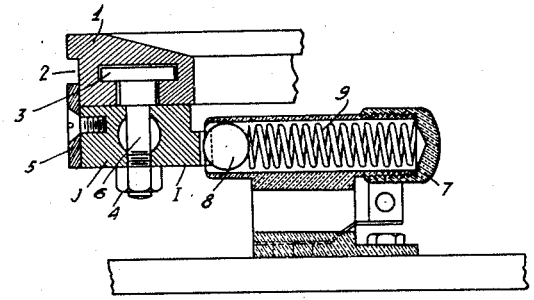
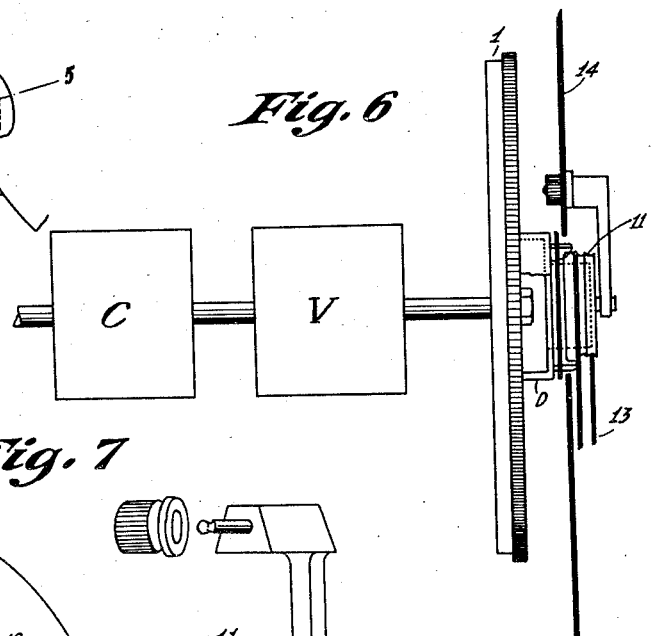
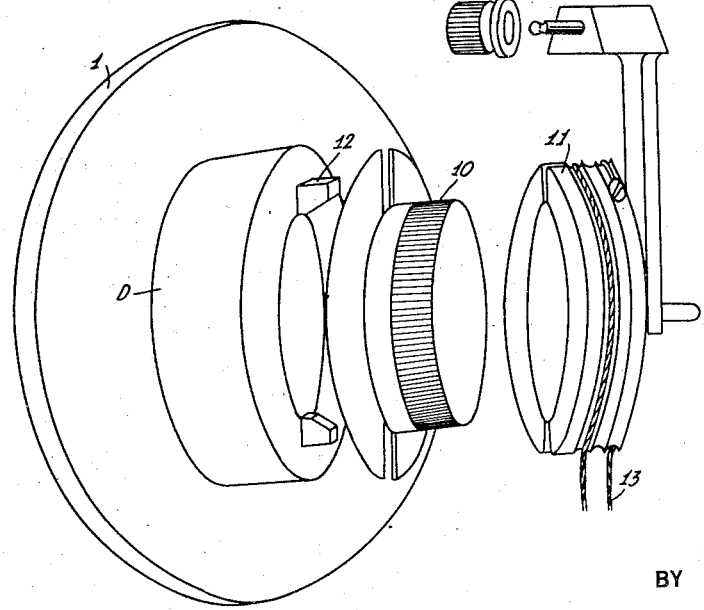
INVENTOR
JACQUES MOREL
BY
ATTORNEY

UNITED STATES PATENT OFFICE 1,977,397

RADIO TRANSMITTER

Jacques Morel, Paris, France, assignor to Compagnie Generale de Telegraphie sans Fil, Paris, France, a corporation of France Application August 27, 1930, Serial No. 478,057
In France September 11, 1929

5 Claims. (Cl. 250—36)

The present invention, concerns transmitting stations for electromagnetic waves with electronic tubes.

Its purpose consists in improving, in stations of this type, the elements of oscillating circuits and of antenna coupling means in the manner that the station may be placed instantaneously, without dial readings, searching or testing, in operating condition on a wave length of predetermined value of any magnitude within a relatively extended range, by conserving at the same time the best output and coupling conditions in the entire scale of the operating range.

A station of this type is particularly adapted, although by no means exclusively, to function as aviation station with remote control.

The object of the present invention is accomplished by the use of a novel generating circuit, a novel control therefor, and a novel combination of electrical and mechanical elements.

The nature of the invention and the operation thereof will be understood from the following detailed description, and therefrom when read in connection with the drawings throughout which like reference characters indicate like parts, and in which.

Figure 1:
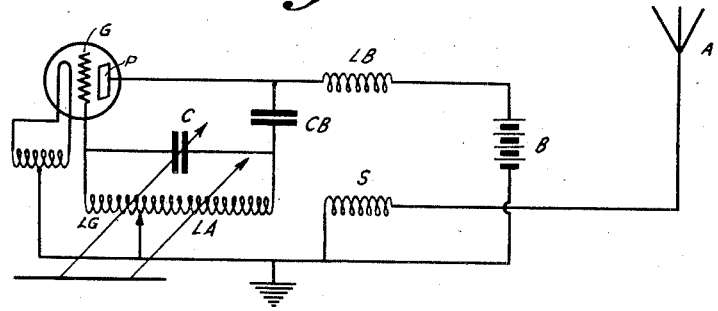
Figures 1 and 3 show oscillation generator circuits.

Fig. 1 represents the diagram of a type of the classical talking circuits in which is connected the device according to the invention. In this figure, G is the grid of the generator tube, P the plate, supplied from the high voltage source B through the blocking induction coil LB. Between the two grid-plate electrodes is disposed, with the insertion of a blocking condenser CB, the talking circuit composed of the variable condenser C and the two self-inductances LG and LA, with mutual variable induction and whose common point is grounded or connected to the body of the plane or to a counter-capacity. The antenna A is coupled to the oscillating circuit, preferably in loose manner, by means of coupling coils such as S. There will be specified, later on, an improved coupling method in accordance with the invention.

Figure 2:
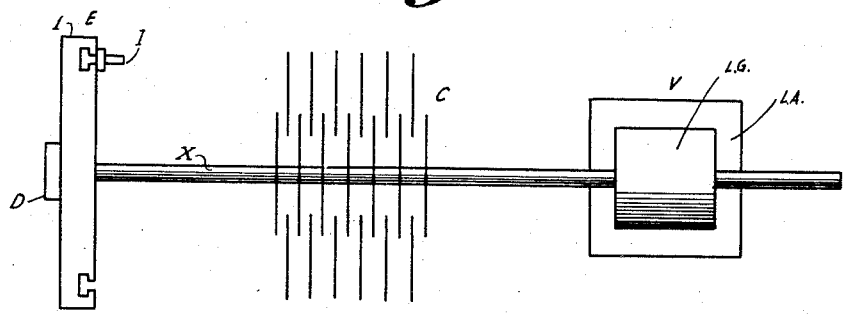
Figure 2 shows diagrammatically a mounting for certain of the elements of the circuits of Figures 1 and 3; while, Figures 4 to 7 inclusive show in detail the control means for the oscillation generator.

According to the invention, there is mounted on the same shaft X (Fig. 2), the variable condenser C and the variometer V, composed of two inductances LG and LA, the first being the rotor, the other the stator.

The shaft X, as will be seen by inspection of Figures 2 and 4 to 7 inclusive, supports a drum 1 having its outer periphery recessed at 2, as shown more in detail in Figure 5. A continuous T-shaped groove 3 is formed in one face of the flange 1. A plurality of stop members I may be bolted to the face of the drum 1 by means of bolts 6 terminating in T-shaped heads at one end and a threaded portion at the other end, which permits a nut 4 to clamp the body J of the stop member I against the drum 1 for rotation therewith. Members 5 carrying indices thereon, as shown, may be fixed to the body J of the stop member I so that said stop member may be moved to the desired angular position, as indicated by the indices and the graduated periphery of the drum 1. By loosening the nut 4 in one of the stop members I carrying the indices, 5 may be moved to the desired point on the periphery of 1 and bolted thereto. The stop members I are provided with recesses 6 wherein, as the drum 1 is rotated, the balls 8, thrust by the spring 9 disposed in the fixed system 7, may enter to stop and maintain the drum 1 fixed to the shaft X carrying the capacity C and continuously variable inductance V in a predetermined position.

The drum 1 is furnished with an integral collar D which is covered by a hood or cap 10, which on the one hand passes through the panel 14, and on the other hand is supplied with slots which engage complementary members 12 on the collar D so that rotation of the cap 10 will cause rotation of the collar D and the drum 1. The cap 10 engages with a driving member 11 having slots herein, which also engage with the members 12 on the collar D. The driving member 11 is furnished with cables 13 adapted to impart to 11 rotary movement in the desired direction so that the transmitter may be regulated during operation from a remote poin .

The profile of the condenser blades is established in the manner that the capacity C varies proportionally to the angle of rotation $\theta$:

$$C = K_1 \theta.$$

On the other hand, the variometer is construc ed in the manner that the total inductance also varies proportionally with the angle of rotation $$L = K_2 \theta.$$

Under these conditions, the wave length of the oscillating circuit is proportional to the angle of rotation $$\lambda = K_3 \theta.$$

In order to preserve an appreciable constant value in the efficiency over the entire extent of the range, there is maintained between L and C such a ratio of variation that the condition $$L/RC = \text{constant}$$

is sufficed, while the condition $$LA/LG = \text{constant}$$

is accomplished by providing the variometer with equal self-inductances on the stator and on the rotor.

Figure 3:
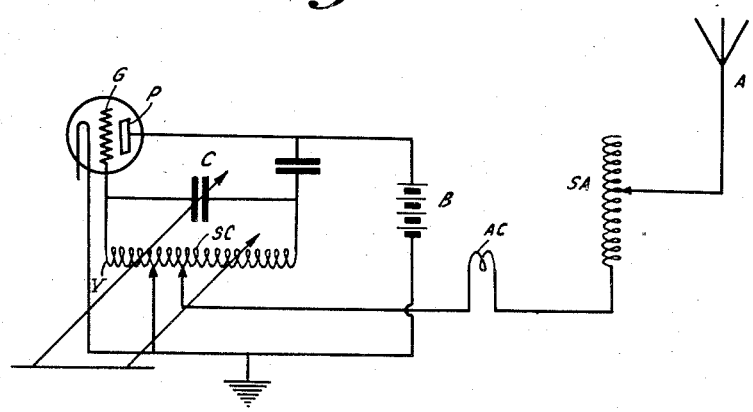

Finally, the coupling with the antenna is realized, according to the invention, in the following manner (Fig. 3): several turns SC of the variometer V, quite a small number (generally two turns are sufficient) in order to accomplish a loose coupling, are directly inserted in the circuit antenna-earth, the tuning of the antenna being accomplished for instance by means of the self-inductance SA. For the purpose of preserving over the entire extent of the range the condition of optimum coupling, without operating a movable element, an anti-coupling turn AC is provided between the antenna and the coupling turns, exerting an action inverse to the one of the latter.

It is well understood that the invention is subject to numerous constructional modifications: it is in particular adaptable, whatever the number of tubes in the station in question, and equally well, to radiotelegraphic and radiotelephonic transmitting stations; on the other hand, the mechanical ratchet arrangements of the pointers, or the setting of the same along the graduated scale may find the most varied practical applications, according to the preferences of the man trained in the art.

The novel features of the invention may be briefly summarized as follows:—

Improvements in radioelectric transmitting stations, representing the means for preserving the best conditions of efficiency and coupling over an entire wide range of wave lengths, thereby insuring the automatic adjustment for all the waves by means of a simple remote control.

The invention consists principally in the mechanical mounting on the same shaft of movable elements, sufficing, on the other hand, particular electric conditions and, in accessory manner, in the addition of control devices and devices or the stopping of the movement and special electric antenna coupling means.

Under the heading of new industrial product, transmitting station with automatic adjustment, comprising the said improvements.

The application of the invention to movable stations such as aviation stations.

I claim:

1. In a short wave oscillation generator, a thermionic tube having coupled input and output circuits comprising a continuously variable inductance common to both of said circuits, a capacity connected between the input and output electrodes of said tube, means for producing continuous changes in said capacity and said inductance over a predetermined range comprising a shaft operatively connected with said capacity and said inductance, means for insuring the generation of any one of a number of predetermined frequencies by said generator including a member fixed to said shaft, and a plurality of adjustable stops variably mounted on the periphery of said member, a load circuit conductively coupled with a point on said continuously variable inductance, and anti-coupling means comprising an inductance in said conductive coupling to insure constant energy transfer between the variable inductance and the load circuit over the entire tuning range.

2. In a short wave oscillation generator, a thermionic tube having coupled input and output circuits, and means connected with said circuits for insuring production of oscillations efficiently over a band of frequencies which may be varied continuously within limits including, a continuously variable inductance common to both of said circuits, a condenser connected with said inductance, means for producing continuous changes in the capacity of said condenser and in the value of said inductance over a predetermined range comprising a common shaft operatively connected with said condenser and said inductance rotation of said shaft producing changes in the capacity of said condenser and in said inductance which vary in proportion to the angle of rotation of said shaft, and means for insuring the generation of any one of a number of predetermined frequencies by said generator including, a disk shaped member fixed to said shaft, a plurality of adjustable stops variably mounted on the periphery of said member, and a fixed stop adjacent the path of rotation of said adjustable stops.

3. In a short wave oscillation generator, a thermionic tube having coupled input and output circuits, and means connected with said circuits for insuring production of oscillations efficiently over a band of frequencies which may be varied continuously within limits including, a continuously variable inductance common to both of said circuits, a point on said inductance being connected to ground and to the cathode of said tube, a condenser connected with said inductance, means for producing continuous changes in the capacity of said condenser and in said inductance over a predetermined range comprising a common shaft operatively connected with said condenser and said inductance means for insuring the generation of any one of a number of predetermined frequencies by said generator including a disk shaped member fixed to said shaft, a plurality of adjustable stops mounted on the periphery of said member and a fixed stop adjacent the path of rotation of said adjustable stops, a load circuit conductively coupled with a point on said continuously variable inductance, and anti-coupling means comprising an inductance in said conductive coupling to insure a constant energy transfer between the variable inductance and the load circuit over the entire tuning range.

4. An ultra-high frequency transmitter comprising, a thermionic tube having control electrode, anode and cathode, an oscillation circuit connected between the control electrode, the anode and the cathode of said tube, a continuously variable inductance in said circuit, a tuning capacity connected in parallel with said inductance, and a rotatable shaft connected with said inductance and said tuning capacity, the electrical characteristic of each of said inductance and said capacity being proportional to the angles of rotation of the said shaft and the ratio between the inductance and the product of the resistance of the oscillation circuit by its capacity being constant.

5. In a short wave oscillation generator adapted to produce oscillations of constant amplitude over a predetermined range without changing the tuning elements of the generator, a thermionic tube having input and output electrodes, a continuously variable inductance or variometer connected between said input and output electrodes, a condenser connected in parallel with said inductance, means for producing continuous changes in said condenser and said inductance over the entire tuning range, said means comprising a shaft on which a movable element of said condenser is mounted and on which a movable portion of said inductance is mounted, means for rotating said shaft, the capacity of said condenser and the total inductance of said inductance varying proportionally as the angle through which said shaft is rotated varies whereby the wave length of the oscillation circuit is proportional to the angle of rotation of the shaft, stop members located on said shaft, a plurality of members fixed adjacent said stop members and cooperating therewith to stop rotation of said shaft in predetermined positions of rotation, and means for rotating said shaft from a remote point.

JACQUES MOREL.